United States Patent [19]

in'tVeld

[11] 4,053,414

[45] Oct. 11, 1977

[54] OIL RECOVERY APPARATUS

[75] Inventor: Cornelis in'tVeld, Vlaardingen, Netherlands

[73] Assignee: National Marine Service, Inc., St. Louis, Mo.

[21] Appl. No.: 711,215

[22] Filed: Aug. 3, 1976

[30] Foreign Application Priority Data

Nov. 26, 1975 Netherlands ............... 7513810

[51] Int. Cl.$^2$ ............................................ B01D 21/24
[52] U.S. Cl. ................. 210/117; 210/DIG. 5; 210/315; 210/513
[58] Field of Search ............... 210/DIG. 5, DIG. 25, 210/519, 521, 532, 242, 172, 333, 83, 315, 117, 513; 61/1 F

[56] References Cited

U.S. PATENT DOCUMENTS

| | | | |
|---|---|---|---|
| 1,093,994 | 4/1914 | Kaibel | 210/519 |
| 3,313,417 | 4/1967 | Rosaen | 210/172 X |
| 3,339,736 | 9/1967 | Muller | 210/333 X |
| 3,450,632 | 6/1969 | Olson et al. | 210/DIG. 5 |
| 3,661,264 | 5/1972 | Peterson et al. | 210/242 |
| 3,675,771 | 7/1972 | McKee | 210/242 |
| 3,738,492 | 6/1973 | Trillich | 210/DIG. 5 |
| 3,752,317 | 8/1973 | Lithen | 210/242 |
| 3,862,904 | 1/1975 | Weatherford | 210/242 |
| 3,909,416 | 9/1975 | In't Veld | 210/242 |
| 3,966,603 | 6/1976 | Grant | 210/DIG. 5 |
| 3,977,975 | 8/1976 | Geurtsen | 210/315 |

*Primary Examiner*—Theodore A. Granger
*Attorney, Agent, or Firm*—Bacon & Thomas

[57] ABSTRACT

A marine vessel is provided with a closed tank for gravity separation of oil and water. A boom extending laterally from the vessel sweeps the surface of a body of water on which the vessel floats and a skimmer associated with the boom skims surface oil and some water into a conduit leading to a manifold extending around the upper inner periphery of the tank. The manifold discharges upwardly into the tank through a multiplicity of ports, the tank preferably being completely filled with oil and/or water. Separated water is withdrawn from the bottom of the tank through a plurality of coalescing filters having large exposed coalescer screens. Hoods over the coalescers direct flow thereto to ensure uniform distribution of water and oil globules over their surfaces and direct coalesced oil toward the upper region of the tank in a concentrated stream. A pump withdraws the water from the tank and discharges it into the ambient water. Flow produced by the pump can be reversed for backwashing the coalescers. A detector in the tank senses the level of the interface between separated water and oil and when that interface reaches a predetermined lower level flow in the separator is interrupted, after which flow is reversed until the interface rises to a desired upper level.

9 Claims, 6 Drawing Figures

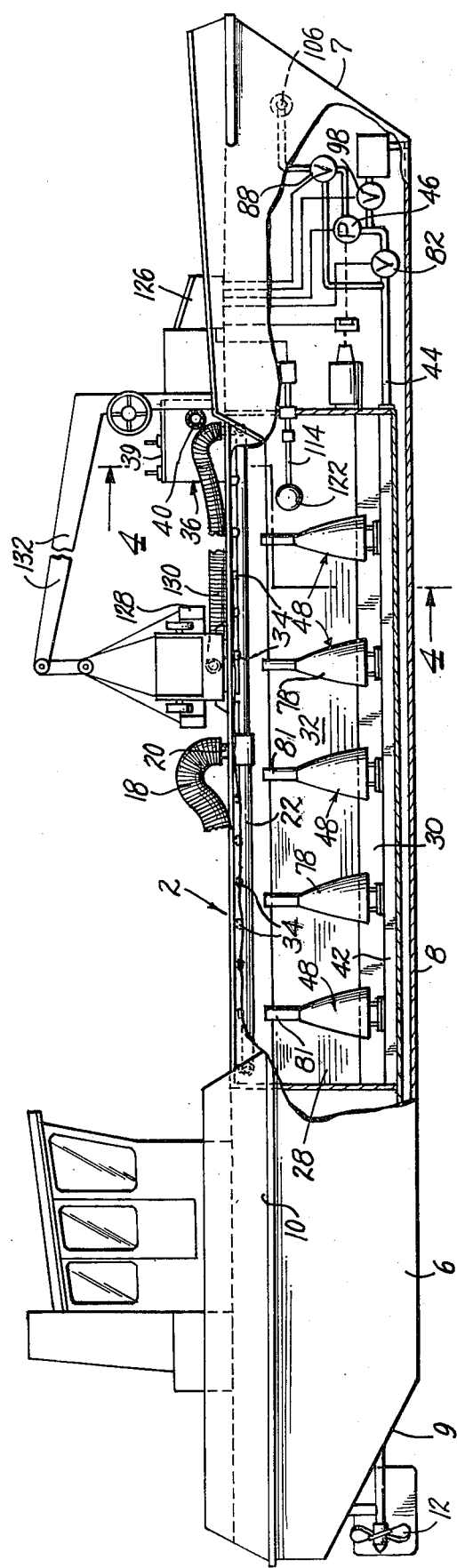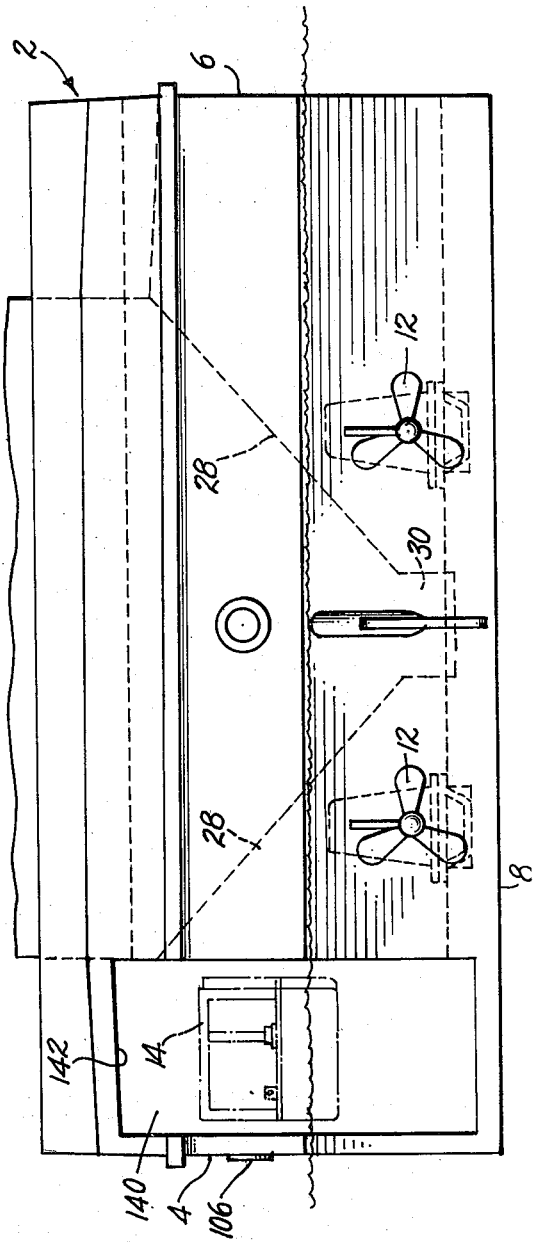

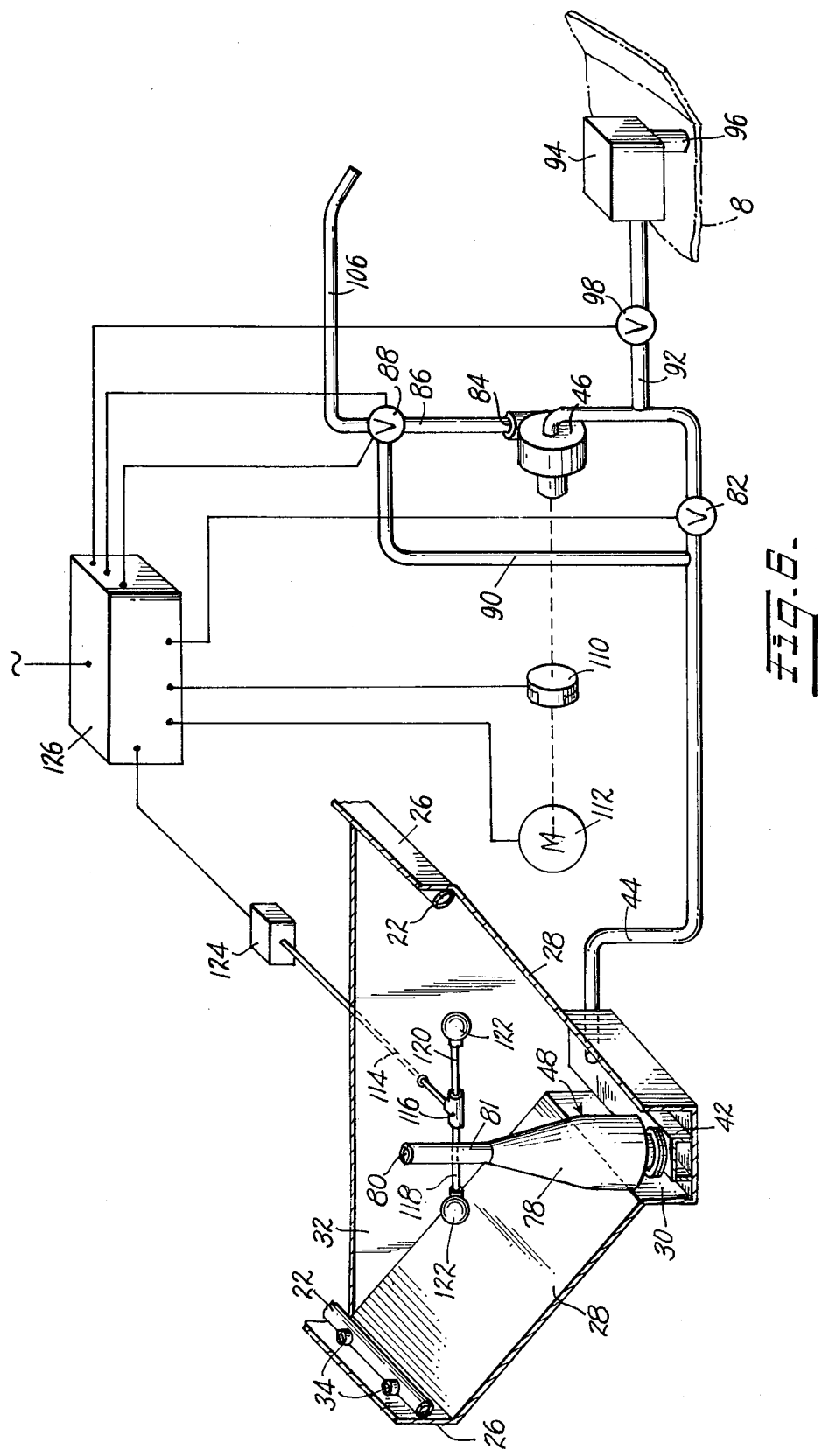

OIL RECOVERY APPARATUS

BACKGROUND OF THE INVENTION

This invention is in the field of oil recovery from bodies of water wherein a vessel gathers surface water and oil for separation.

It is known in the art to provide buoyant vessels with means for gathering films of oil spilled on bodies of water along with some of the surface water and provide means for gravity separation of the oil from the water. Such prior vessels, however, have not been wholly successful and were unable to effect separation at a sufficiently high rate to be fully economical.

SUMMARY OF THE INVENTION

The present invention is an improvement in the oil recovery vessel disclosed in my prior U.S. Pat. No. 3,909,416, dated Sept. 30, 1975.

It is an object of this invention to provide a vessel of the type referred to in which oil and water mixtures are delivered to a gravity separation tank with a minimum of turbulence, thus minimizing intermixing of water and oil.

A further object is to achieve the previous object by means of a manifold in a gravity separation tank, the manifold discharging oil and water mixtures into a tank at a multiplicity of positions within the body of liquids contained in the tank.

It is another object of the invention to provide a vessel of the type referred to capable of substantially continuous operation and providing for a high rate of throughput.

A further object of the invention is to provide a vessel achieving the previous objective by means of a multitude of oil particle coalescing means presenting a large surface area to flow of water from said tank to an outlet.

A still further object of the invention is to provide a vessel achieving the previous objectives having means for effecting a uniform distribution of water and oil particles over substantially the entire surface of the coalescing means referred to.

Another object is to provide such a vessel wherein means are provided for backwashing the coalescers and collecting and directing the oil particles discharged therefrom in a manner minimizing remixing of those particles with water and facilitating further coalescence of the oil.

An additional object is to provide an oil recovery vessel employing a removable sweep boom, the vessel having compartment means for storage of the boom for transport without necessitating hoisting the boom out of the water.

A still further object is to provide such a vessel capable of substantially continuous automatic operation with a minimum of manual or personal control.

More and additional objects will become apparent to those skilled in the art as the description proceeds with reference to the accompanying drawings.

BRIEF DESCRIPTION OF THE DRAWINGS

FIG. 2 is a side elevational view of the vessel of FIG. 1 with portions of the side thereof broken away to show internal structure;

FIG. 3 is a rear view of the vessel of FIGS. 1 and 2;

FIG. 6 is a schematic view of portions of the vessel showing conduits and control means therefor.

DESCRIPTION OF A PREFERRED EMBODIMENT

Figure 1:
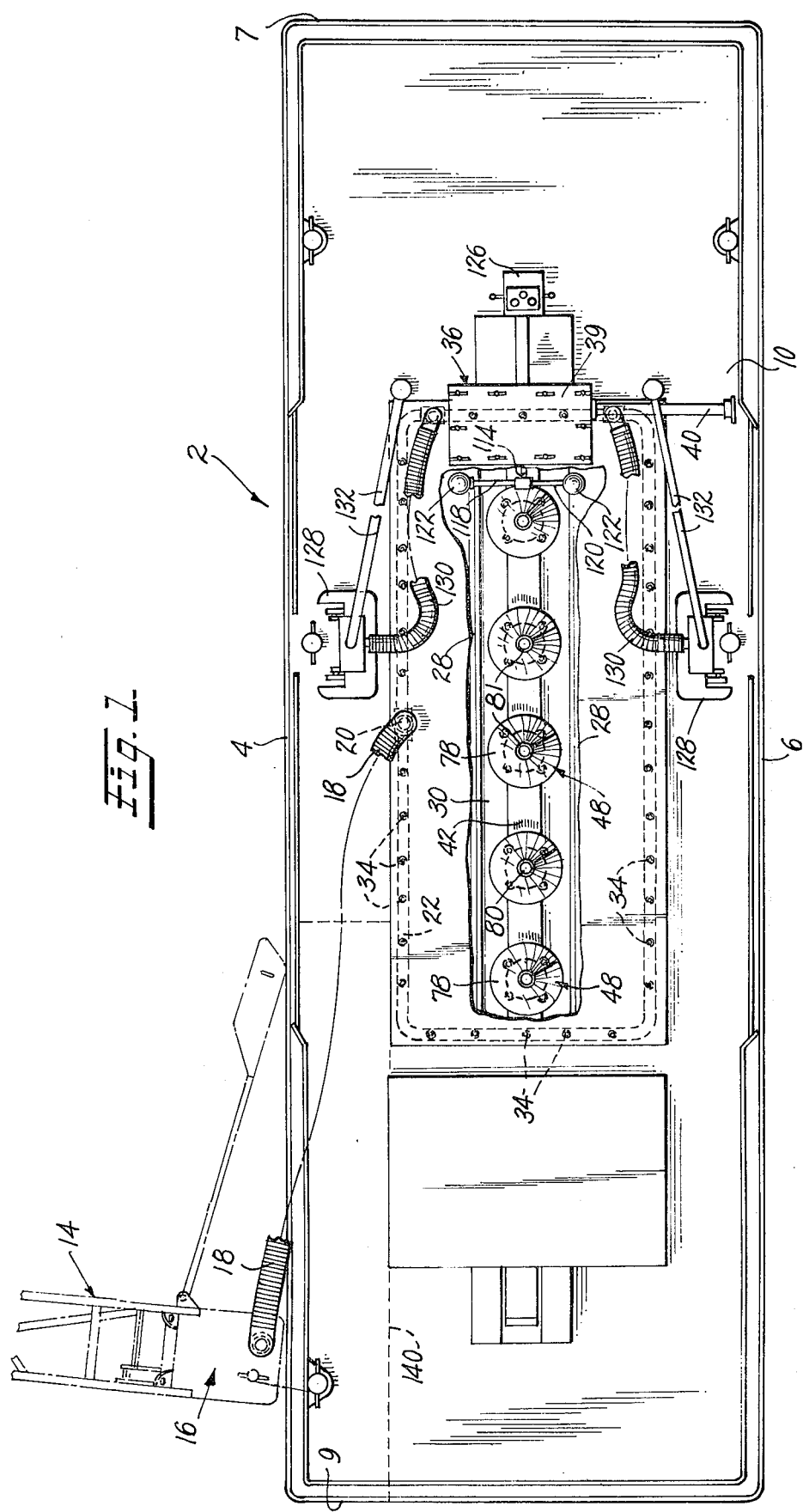
FIG. 1 is a top plan view of a vessel embodying the present invention, portions of the upper deck being broken away to show internal structure.

Numeral 2 designates generally the vessel of the present invention having an outer hull structure comprisinng sides 4 and 6, bow 7, stern 9, a bottom 8, and an upper deck 10. Within the hull of the vessel in suitable spaces provided (not shown) are motors or the like for driving propellors 12 to effect progress of the vessel through a body of water. It is to be understood, however, that the invention may be employed on a vessel that must be towed or pushed.

Figure 4:
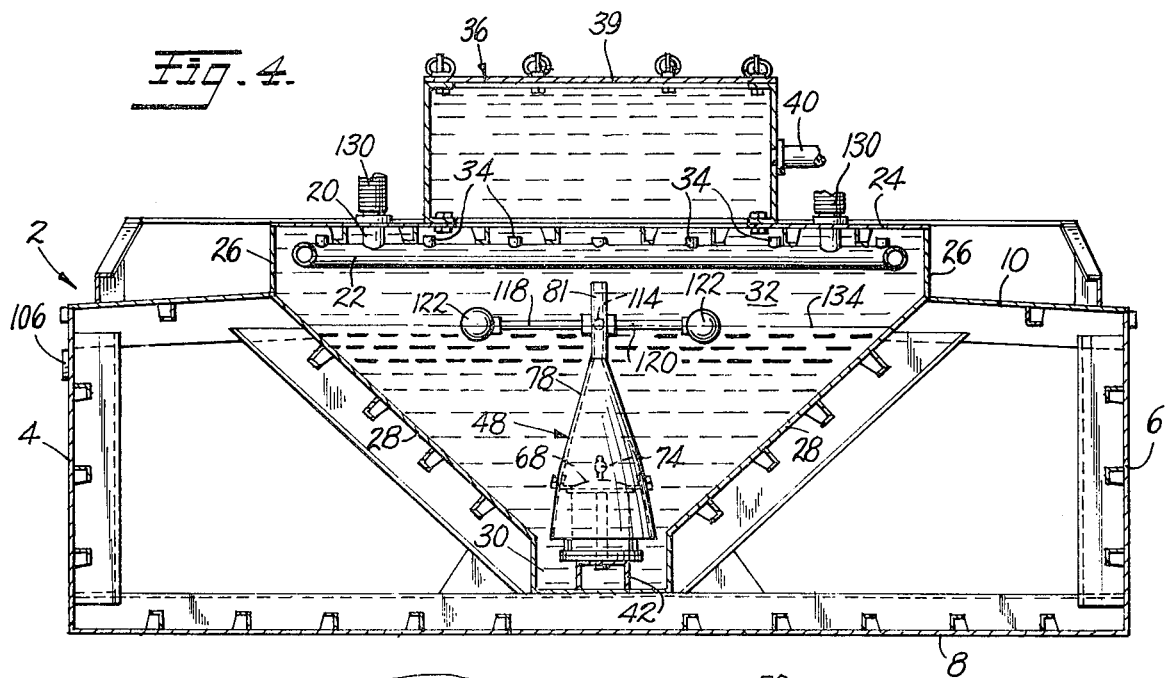
FIG. 4 is an enlarged transverse sectional view taken substantially on the line 4—4 of FIG. 2.

As shown in FIG. 1, a sweep boom generally designated 14 is releasably secured to a side of a vessel to extend laterally therefrom. The boom is constructed to sweep a film of oil on the surface of the body of water, and some of the surface water inwardly toward the vessel 2 as the latter progresses along its course and to direct the oil and water mixture to a skimmer indicated generally at 16. The structure of the boom 14 and skimmer 16 are fully shown and described in detail in my copending application Ser. No. 634,505, filed Nov. 24, 1975. The details of the boom and skimmer 16 include a weir over which the surface water and oil flow into a suitable compartment with which a conduit 18 connects. As shown, the conduit 18 is preferably a flexible tubular type of conduit and extends from the skimmer 16 to the deck of the vessel connected to a fitting 20 communicating with a manifold 22. As best shown in FIG. 4, the interior of the vessel 2 is constructed to define a closed tank, the upper surface of which is shown as defined by a tank top 24, short vertical tank sides 26 and downwardly converging bulkhead portions 28. The bulkhead portions 28 terminate at the sides of a longitudinally extending channel 30 defining the bottom of the separation tank. The manifold 22, previously referred to, is shown as a closed loop extending around the inner periphery of the tank 32 near the top thereof and is provided with a multiplicity of upwardly directed spaced outlets 34 extending completely along the length of the manifold 22, that is, the outlets 34 are dispersed around the entire upper periphery of the separation tank. Over the tank 32 are appropriately spaced access trunks 36, only one of which is shown in the drawings. The trunks 36 are each provided with a suitable hatch 39 providing access to the tank 32 through trunk 36. A conduit 40 communicates with the trunk 36 for withdrawal of oil.

Extending longitudinally within the channel 30 is a further tubular manifold 42 communicating at one end with a conduit 44 (see FIGS. 2 and 6) leading to the inlet of a pump 46. Spaced along the manifold 42 is a plurality of coalescing devices generally designated 48. Each of the coalescing devices is in the nature of a cylindrical array of screens of suitable material for separating particles of oil from water passing therethrough. Each comprises a lower plate 50 having a resilient sealing sheet 67 thereon and an upper plate 54 having a similar sealing sheet provided with openings aligned with openings 58 in plate 54. Clamped between the plates 50 and 54 are cylindrical members 60, each of which comprises a sheet of expanded metal defining a rigid screen as support for an outer oil coalescing layer 62 of oleophobic but water pervious material. Those cylindrical members are pressed into sealing engagement with sealing sheets 67, as at 52 and 56. From the manifold 42 there is a perforated tube 64 extending upwardly into the central portion of each coalescer 48. Suitable clamping bolts 66 extend through the upper plates 54, lower plate 50 and brackets 51 secured to manifold 42. The bolts are tensioned by the nuts shown to hold the parts in the described relation with a suitable resilient sealing gasket 69 between plate 50 and manifold 42. Extending over and spaced from the upper plate 54 is a dome structure 68 defining a closed compartment 70 between the plate 54 and the dome structure. The dome 68 is held in the illustrated assembled relation by means of the bolts 66 previously described. Extending upwardly from the central portion of the dome 68 is a short conduit 72 provided with a checkvalve 74 therein. The checkvalve 74 is arranged to permit flow upwardly therethrough but to prevent downward flow.

Also clamped to the structure described by the bolts 66 are brackets 76 to which is secured a hood 78 generally conical in shape. The hood 78 for each coalescer 48 is of generally conical construction and extends downwardly around the major upper portion of the coalescer screens described but terminating at its lower edge upwardly from the top of manifold 42. As shown, particularly in FIG. 5, each hood 48 is spaced outwardly from the screens 60 and converges upwardly above the described structure. It terminates in an upper opening 80 at the top of a stack portion 81 and within the body of collected oil in the top of the tank 32, the opening 80 being small in comparison to the diameter of the outermost cylindrical screen 60. By way of example, the cylindrical screens 60 and material 62 may define a coalescer portion of about 18 inches (about 45 cm) diameter and 2 ft. (about 61 cm) in height, in which instance, the opening 80 would be of a diameter in the range of 2 to 3 inches (about 5 to 7½ cm), the height of the tank 32 being from 6 to 8 ft. (1.8 to 2.4 m).

The conduit 44 (see FIG. 6) extending from manifold 42 to the inlet of pump 46 is provided with a valve 82. The outlet 84 of pump 46 communicates with a conduit 86 having a three-way valve 88 therein A further conduit 90 extends from the three-way valve 88 to the conduit 44 outwardly of the valve 82. The conduit 44, between valve 82 and pump 46, communicates with a conduit 92 leading to a more or less conventional sea chest 94 having communication, through fitting 96, in the bottom of the vessel, with ambient water outside the hull. As shown, the conduit 92 is provided with a valve 98.

The three-way valve 88, previously referred to, is of a type wherein it can be set to provide communication between conduits 86 and 90 while closing the end of a further conduit 106 or it can be set to close the adjacent end of conduit 90 while providing communication between conduits 86 and 106. The pipe 106 is directed to discharge water from pump 46 into the body of water in which the vessel is navigating, as will be more fully described. As shown schematically in FIG. 6, a clutch 110 is provided to effect a drive connection between a suitable motor 112 and the pump 46 or to disconnect that drive if and when desired.

Figure 5:
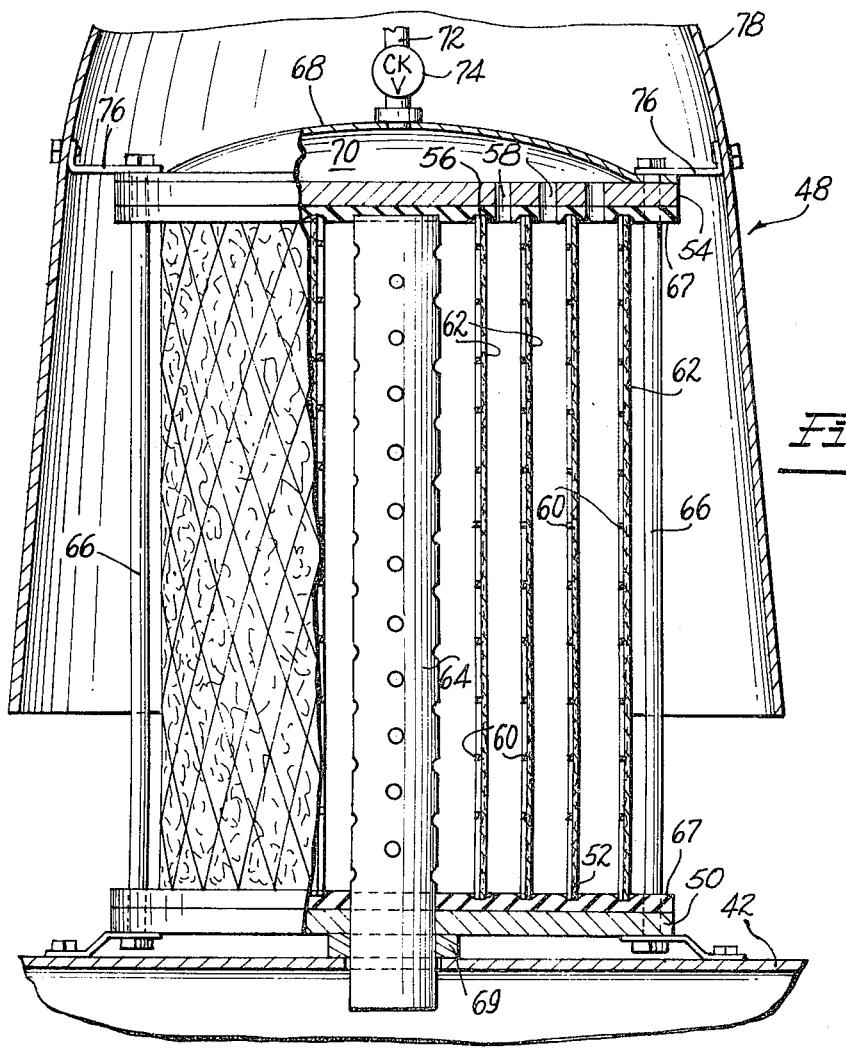
FIG. 5 is an enlarged longitudinal sectional view of one of the coalescing devices of the present invention.

Referring now particularly to FIGS. 5 and 6, a rotary shaft 114 extends into the tank 32 at a selected level, through suitable sealing means, and is journalled for rotation about its longitudinal axis. At the end of the shaft 114 within tank 32 is a fitting 116 supporting a pair of radial arms 118 and 120. It is to be noted that the arm 118 is longer than the arm 120. At the ends of each of the arms 118 and 120 are buoyant bodies 122. Each of the bodies 122 may be of identical buoyancy and of such over-all density that they would individually float readily in water, whether it be fresh or saline, and in oil. The shaft 114 operates a suitable transducer or switch 124 to produce a signal directed to the schematically shown control box 126. The construction of the control box 126 may be of any desired form and may include a complete control panel for manual operation and suitable responsive means to perform desired functions in response to the signals from transducer 124. Suitable instrumentalities for control box 126 are known to the art and can be readily adapted to this invention by those skilled in the art.

Suitable control conductors extend from the box 126 to the motor 112, clutch 110 and to actuators to operate each of the valves already referred to.

It is contemplated that the vessel of the present invention may also be provided with additional skimmer devices, similar to the skimmer 16, and identified by numeral 128. The skimmers 128 are provided with conduit 130 also communicating with the manifold 22 previously described and manipulable by any suitable crane structures 132 on the vessel. The skimmers 128 are available as alternates to boom 14 and skimmer 16 to admit oil and water mixture to the tank 32 by being lowered into the surrounding water in situations where nearby structures such as docks, pile clusters or other obstructions cause operation of boom 14 to be impractical.

It is to be understood that operation of the described vessel starts with the tank 32 completely filled with water. As the vessel progresses along its course, the pump 46 is caused to operate, with valve 98 closed and valve 88 arranged to direct water from pump 46 to conduit 106 to be discharged directly into the surrounding body of water. As the pump 46 withdraws water from tank 32, a suction condition is created in the tank which will draw an oil-water mixture from skimmer 16 or skimmer 128 into the manifold 22. The water mixture drawn into and through manifold 22 emerges from outlets 34 into the liquid in the tank 32 and since there are a multiplicity of those outlets, the velocity of the oil-water mixture coming therefrom is relatively low and thus minimizes turbulence and mixing of oil particles and water. As is known, the oil will tend to separate from the heavier water and rise to the top of the tank while the partially clarified water is drawn downwardly through tank 32 and through the coalescing devices described into manifold 42.

The downwardly flowing water in tank 32, with some oil particles entrained therein, is directed by the hoods 78 to the lower regions of the coalescer screens to thus carry with it any entrained oil particles. This gives the oil particles more time to separate by gravity and rise in the water. If the hoods 78 were not present, more of the oil particles, being lighter than water, would tend to approach the upper portions of the screens and thus result in a more uneven and less effective use of the screens. The total area between the lower edges of the hoods 78 and the filter structures is many times greater than the area of the openings 80 at the tops of the hoods 78 and thus substantially no water or oil will be drawn downwardly through those openings 80 by the suction of the pump, the flow being substantially exclusively around the outsides of the hoods. As operation continues, some of the oil particles may pass through at least the outer screen 62 and possibly through one or more inner layer in which case they may rise in one of the annular spaces and pass through openings 58 into the chamber 70 below dome 68 and be collected therein. Some oil collects in the dome 68. That oil being lighter than water will rise under the dome 68 toward the checkvalve 74 which will open during back flushing (to be described) and permit that oil to flow upwardly and outwardly through tube 72 and opening 80 to coalesce with an upper body of oil in the top of the tank 32, accumulated by gravity separation.

As is known, a body of oil will accumulate in the upper portion of the tank 32 and more or less clarified water will accumulate therebelow. There is an interface between the body of water and the body of oil, which interface is designated in FIG. 4 by numeral 134. The level detecting means comprising shaft 114 and bodies 122 on arms 118 and 120 is positioned at a level corresponding generally to the lowest level to which it is advisable or desirable to allow the interface to descend as the oil accumulates in tank 32. The level detecting device, having the two buoyant bodies thereon, is quite sensitive to the level of the interface 134. Obviously, the buoyant body on arm 118, when both bodies are below the surface of the same liquid, exerts a greater turning moment on shaft 114 than does the body on arm 120 since the latter arm is shorter. The body on arm 118 will seek the interface 134 and remain stable thereat, only a portion thereof projecting upwardly into the body of oil. Thus, the rotative position of shaft 114 will indicate the location of the interface, since the body on the longer arm remains at the interface 134.

When the interface 134 reaches a predetermined lower level in the tank 32, the transducer 124 provides a signal to the control box 126 resulting in the actuation of valve 82 to closed position, resetting valve 88 to direct water from the outlet pump 46 into conduit 90 and to open valve 98 whereby water may be withdrawn from the surrounding body of water and delivered under pressure to the manifold 42. This results in forcing water inwardly through perforated pipe 64 to the interior of the coalescer devices and outwardly through the screens 60 and the material 62 thereon. This back flow will tend to dislodge any oil particles adhering to the coalescer material. Those particles on any of the interior screens rise through openings 58 into compartment 70 and are discharged therefrom through tube 72 to the interior of the hood 78. Those particles on the outer surface of the outermost layer 62 are released therefrom and will rise upwardly within the hood 78. All of the oil particles within hood 78 are caused by the shape thereof to converge toward opening 80. This causes the particles to come closer together and enhances fusion or agglomeration of those bodies into a single body of oil. During such backwash operation, as just described, means must be provided to prevent outflow of oil through the manifold 22 into conduit 18 or conduits 130. While not shown herein, suitable valve means are provided in those conduits to control oil flow outwardly. However, the pressure generated by the pump 46 in pumping water into the tank 32 results in forcing the body of oil from the tank 32 through a conduit 40. The oil can be withdrawn through conduit 40 to be stored until the vessel reaches port or alternatively discharged through a base into an accompanying barge for separate disposal ashore. While not shown herein, the conduit 40 may be provided with suitable valving or other closure means, as will be obvious to those skilled in the art.

It is further contemplated that the transducer 124 may be arranged to provide a further signal at a time when the interface 134 has reached an upper predetermined level during the described backwashing operation. That further signal may be processed in box 126 to again close valve 98, open valve 82, and restore valve 88 to provide communication between conduits 86 and 106 whereupon the pump will induce flow of oil and water mixture inwardly through conduit 18 to tank 32 and the process may continue to cycle as described.

In an alternate configuration a separate pump whose operation is controlled by interface detector transducer 124 through box 126 may be employed to withdraw oil from the upper regions of tank 32 while the oil recovery vessel continues to sweep without interruption. Oil withdrawn by this means is either discharged into an accompanying barge, retained on board in separate tanks, or discharged into collapsible rubber bags which when full are cast overboard to be towed ashore by other vessels.

In this alternate arrangement back-flushing of coalescers is accomplished at appropriate intervals by the use of manually operated controls.

It is also contemplated that the box 126 include any desired manually operable overriding controls and particularly manually operable control means for the valves.

It is also contemplated that a separate pump (not shown) could be used for the backflush operation, using a separate source of water if desired.

Referring now particularly to FIGS. 1 and 3, in the region within the hull of vessel 2 not occupied by the tank 32, motors or other mechanisms, there is provided a fore and aft extending compartment 140 opening to the exterior of the vessel 2 and being of a height to extend both above and below the waterline. That opening is best illustrated in FIG. 3, opening through the stern of the vessel. When it is desired to transport the vessel and boom 14 without collecting surface oil from the body of water, the boom 14 may be disconnected from the vessel 2 and from conduit 18. As described in my copending application previously referred to, the boom 14 is buoyant and will float in the body of water by itself. Thus, when disconnected from the vessel, the boom may be floatingly directed around to the stern of the vessel and aligned with the compartment 140 and the opening 142 thereof whereupon the boom may be floatingly drawn into the compartment 140 and secured therein in any suitable manner while still floating on the body of water. In this condition the vessel may progress at higher speed without the impediment or drag that would be provided if the boom were left in the position shown in FIG. 1.

While a single specific embodiment of the invention has been shown and described herein, the same is merely illustrative of the principles involved and other embodiments may be devised within the scope of the appended claims. For example, it is contemplated that the apparatus may be employed at a fixed location or on a land vehicle rather than on a movable vessel as illustrated. In such cases, oil would be recovered from the surface of bodies of water moving past or through the oil recovery apparatus, as for instance a small natural stream frequently subject to oil pollution, or alternatively the effluent stream of cooling water from an oil refinery. Where a natural fluid pressure head is available, of course, such head can be utilized to cause flow of water and oil mixture into the separating tank to obviate the need for creating a subatmospheric pressure in the tank for circulation purposes.

I claim:

1. In an oil recovery apparatus having a separating tank therein, inlet means for directing an oil-water mixture into the upper portion of said tank and outlet means communicating with the bottom of said tank, the improvement comprising:

said outlet means comprising an outlet manifold extending along the bottom of said tank;
means defining a plurality of separate spaced flow paths between the interior of said tank and said manifold;
a coalescing means extending across each of said flow paths to intercept and coalesce particles of oil in water flowing from said tank to said manifold, said coalescing means comprising a water permeable, oleophobic material;
a cover member overlying each coalescing means to collect coalesced particles of oil rising therefrom but otherwise preventing flow of liquid into or out of the coalescing means from the top thereof;
an outlet passage in the top of each cover member;
a check valve in said passage arranged to permit liquid flow only upwardly and outwardly from beneath each cover member to the interior of said tank; and
a generally conical, upwardly tapered hood member having a lower portion overlying said cover member and the said outlet passage in said cover member.

2. The apparatus as defined in claim 1, wherein said flow paths are defined at least in part by perforated tubes extending upwardly from and communicating with said manifold, and said coalescing means surrounding said tube.

3. Apparatus as defined in claim 1 wherein said tank is provided with a bottom in the form of an elongated upwardly open channel extending between end walls of said tank and downwardly converging side walls extending to the sides of said channel; said manifold being an elongated conduit in said channel with said coalescing means being positioned in said channel on said conduit.

4. In an oil recovery apparatus including a tank for gravity separation of oil and water, inlet means for admitting an oil-water mixture at the top of said tank, outlet means communicating with the bottom of said tank and flow causing means for selectively withdrawing water through said outlet means, the improvement comprising:

a generally upstanding cylindrical coalescer between the interior of the tank and said outlet means to entrap and coalesce any globules of oil entrained in water being withdrawn from said tank;
a generally conical upwardly tapering hood having a lower portion overlying the upper portion of said coalescer and extending upwardly therefrom;
means for normally preventing flow of liquid from the upper internal area of the coalescer to the interior of the hood;
check valve means for permitting flow of liquid from the internal upper area of the coalescer into the interior lower portion of the hood, while preventing reverse flow of such liquid; and
said hood having its upper end open to the interior of the tank.

5. Apparatus as defined in claim 4 wherein said coalescer comprises at least one cylindrical wall of expanded metal and a layer of olephobic but water permeable material on the outer face of said cylindrical wall.

6. Apparatus as defined in claim 4 wherein the bottom portion of said hood surrounds and extends downwardly around the exterior of the upper area of said coalescer a distance substantially more than one-half the height thereof and extends upwardly therefrom to the upper portion of said tank.

7. Apparatus as defined in claim 6 wherein said generally conical hood is open at its upper end with an opening at said upper end that is small relative to the diameter of said coalescer.

8. Apparatus as defined in claim 7 wherein the ratio of the diameter of the lower portion of said coalescer to the diameter of said opening is of the order of 6–9 to 1.

9. Apparatus as defined in claim 6, further including means for causing reverse flow of water into the tank through the outlet means, through the coalescer, and through the hood.

* * * * *